United States Patent [19]
Cimet

[11] Patent Number: 5,483,674
[45] Date of Patent: Jan. 9, 1996

[54] METHOD FOR ESTABLISHING A LOGICAL CONNECTION BETWEEN SITES, SITE CONTROLLERS, AND A SWITCHING CENTER IN A RADIO COMMUNICATION SYSTEM

[76] Inventor: Israel A. Cimet, 891 Silver Rock La., Buffalo Grove, Ill. 60089

[21] Appl. No.: 178,971

[22] Filed: Jan. 7, 1994

[51] Int. Cl.$^6$ .............................. H04B 17/00; H04B 1/02; H04B 7/24; H04M 11/00
[52] U.S. Cl. ...................... 455/56.1; 455/33.1; 455/67.1; 379/59
[58] Field of Search .................................. 455/33.1, 33.4, 455/34.1, 53.1, 56.1, 67.1; 379/58, 59; 395/909, 200

[56] References Cited

U.S. PATENT DOCUMENTS

| | | |
|---|---|---|
| 3,703,006 | 11/1972 | Shama . |
| 4,670,899 | 6/1987 | Brody et al. ............................. 379/60 |
| 5,175,800 | 12/1992 | Galis et al. ............................. 395/909 |
| 5,321,815 | 6/1994 | Bartolanzo, Jr. et al. .............. 395/200 |

OTHER PUBLICATIONS

"Network Topology Optimization—The Art and Science of Network Design"; Roshan L. Sharma Van Nostrand Reinhold—New York, 1990 pp. 101–117.
"Some Graph Partitioning Problems and Algorithms Related to Routing in Large Computer Networks"; A. Boulouias and P. M. Gopal, IEEE Ninth International Conference on Distributed Computing Systems, Newport Beach, Calif., Jun. 1989, pp. 362–370.

Primary Examiner—Chi H. Pham
Assistant Examiner—Mark D. Wisler
Attorney, Agent, or Firm—Daniel C. Crilly

[57] ABSTRACT

A method for establishing a logical connection between a plurality of sites (101–110) and either a plurality of site controllers (112–115) or a switching center (117) in a radio communication system (100) may be accomplished in the following manner. A first site (101) is selected from a first pair of sites (101,104), wherein the geographical separation (119) between the first pair of sites (101, 104) exceeds the geographical separation between any other pair of sites. Upon selecting the first site (101), at least a second site (106, 108) is selected to form a group of selected sites (101, 106–108). The group of selected sites (101,106–108) is assigned to a first site controller (112), or a first control portion (201) of the switching center (117), such that communication resources provided by the group of selected sites (101,106–108) can be accommodated by the assigned controller (112), or control portion (201). Similar to the selection of the first site (101), a third site (102) is selected from a second pair of sites (102, 104) and is assigned to a second site controller (114), or a second control portion (202) of the switching center (117), to establish the respective logical connection.

26 Claims, 2 Drawing Sheets

5,483,674

METHOD FOR ESTABLISHING A LOGICAL CONNECTION BETWEEN SITES, SITE CONTROLLERS, AND A SWITCHING CENTER IN A RADIO COMMUNICATION SYSTEM

FIELD OF THE INVENTION

The present invention relates generally to radio communication systems and, in particular, to a method for logically connecting sites to either site controllers or control portions of a switching center in a radio communication system.

BACKGROUND OF THE INVENTION

Radio communication systems, such as cellular or trunked radio systems, are known to comprise a plurality of communication units, a plurality of sites, a plurality of site controllers, and a switching center. The sites, which comprise radio infrastructure equipment, such as base stations and antenna towers, are located throughout the geographic coverage area of the radio communication system. Each site provides a predetermined number of communication resources (e.g., frequency carriers or time slots) that provide communications support for one or more of the communication units. Each site controller services a group of sites in a particular geographic service area, and is used to translate (i.e., transcode) communications received from its respective sites into a coded format that is compatible with transmission over the public switched telephone network (PSTN). Each site controller also controls the handoff between sites—i.e., reassignment—of ongoing communications in its respective service area. In a similar manner, the switching center services the sites in geographic service areas that may be similar to, or distinct from, the service areas supported by the site controllers. The switching center controls functionality of the complete radio communication system, via control portions contained therein, including communication handoffs between site controllers and interconnections to the PSTN.

In a typical system configuration, the site controllers and the switching center are collocated at a facility that is remotely located from any of the sites. Thus, to provide communications to their respective site controllers, the sites typically utilize radio frequency (RF), or microwave, links to transfer the communications to the site controllers. Accordingly, there is a significant cost associated with the transfer of information between the sites and the site controllers.

To determine which sites reside in each site controller's service area, an assignment algorithm, such as that described in U.S. Pat. No. 3,703,006, is employed to assign the sites to the site controllers such that the costs to transmit information between the sites and the site controllers are minimized. Although this transmission cost minimization is beneficial, the assignment process often produces service areas with overlapping boundaries (i.e., sites residing in more than one service area) and undesired geographic balance (e.g., service areas with long, narrow geometries). The undesired geographic balance typically results in the handing off of an inordinate amount of ongoing communications between the site controllers because the communication units, while communicating, frequently travel through (i.e., into and out of) the various undesirably configured service areas. The additional handoffs increase system cost and complicate system management.

In addition, assignment techniques of the prior art commonly produce an assignment of sites to site controllers in which some site controllers are heavily loaded (i.e., support a substantial number of communication resources) and other site controllers are lightly loaded. That is, the assignment results in a communication resource load imbalance among the site controllers of the system. Accordingly, the heavily loaded site controllers might become a reliability concern over time, while the lightly loaded site controllers contain unused, and correspondingly unnecessary, processing capabilities.

Therefore, a need exists for a method of establishing a logical connection between the sites and either the site controllers or the switching center in a radio communication system, such that geographic balance of service areas is attained, and such that communication resource loading at each site controller, or switching center control portion, is substantially balanced.

DESCRIPTION OF A PREFERRED EMBODIMENT

Generally, the present invention provides a method for establishing a logical connection between a plurality of sites and either a plurality of site controllers or a switching center in a radio communication system. This is accomplished by initially selecting a first site from a first pair of sites, wherein the geographical separation between the first pair of sites exceeds the geographical separation between any other pair of sites. Upon selecting the first site, at least a second site is selected, such that the first site and the other selected sites combine to form a group of selected sites. The group of selected sites is assigned to a first site controller, or a first control portion of the switching center, such that communication resources provided by the group of selected sites can be accommodated by the assigned controller or control portion. Similar to the selection of the first site, a third site is selected from a second pair of sites, wherein the geographical separation between the second pair of sites exceeds the geographical separation between any pair of sites not yet selected. The third site is assigned to a second site controller, or a second control portion of the switching center, to establish the respective logical connection. By establishing the logical connection in this manner, site controllers, or control portions of the switching center, service geographically balanced service areas. Thus, the average number of communication handoffs required between the site controllers, or the switching center control portions, during a communication is substantially reduced as a communication unit travels from one site controller service area to another.

Figure 1:
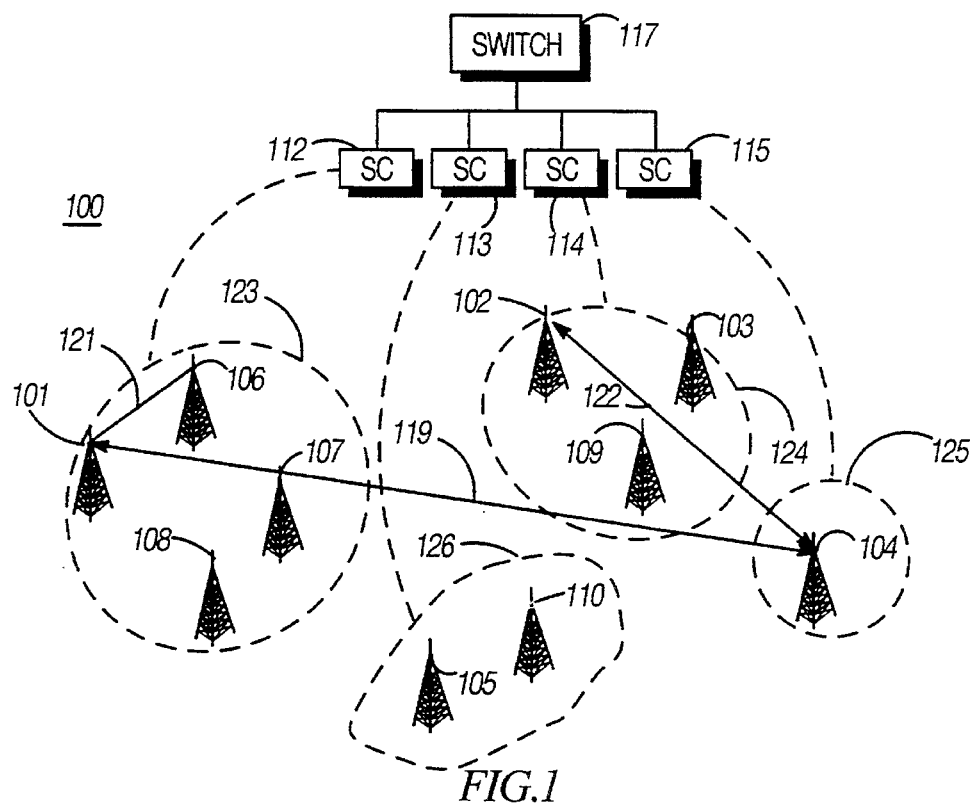
FIG. 1 illustrates a radio communication system that exemplifies the establishment of a logical connection between sites and site controllers, in accordance with the present invention.

The present invention can be more fully described with reference to FIGS. 1–3. FIG. 1 illustrates a radio communication system 100 that includes a plurality of sites 101–110, a plurality of site controllers 112–115, and a switching center 117, in accordance with the present invention. Each site (e.g., 101) is geographically separated from every other site (e.g., 102–110) and generally provides multiple communication resources over which communications occur. The sites 101–110 typically comprise infrastructure radio equipment, such as antenna towers, antennas, base stations, and any associated hardware necessary to interconnect the equipment. The communication resources may comprise frequency carriers, time slots conveyed via frequency carriers, or pseudonoise codes conveyed via frequency carders, depending on the multiplexing scheme used in the particular radio communication system 100. For example, in a time division multiplexed (TDM) system, the communication resources comprise time slots conveyed via a frequency carder; whereas, in a code division multiplexed (CDM) system, the communication resources comprise orthogonal pseudonoise codes conveyed via frequency carriers.

In a preferred embodiment, the site controllers 112–115 comprise Motorola Enhanced Specialized Mobile Radio (ESMR) base site controllers and the switching center 117 comprises a Northern Telecom DMS100™ switch. The site controllers 112–115 transcode ongoing voice conversations, and assist the switching center 117 during the handoff of an ongoing communication from an active site (e.g., 101) to a handoff site (e.g., 106) as a communication unit travels throughout the radio communication system 100. Interconnection between the site controllers 112–115 and the sites 101–110 is generally accomplished via radio frequency or microwave transmission facilities. Interconnection between the switching center 117 and the site controllers 112–115 is preferably accomplished via wirelines when the site controllers 112–115 are collocated with the switching center 117, and through microwave transmission facilities when the site controllers 112–115 are distally separated from the switching center 117. Interconnection between the switching center 117 and the sites 101–110 is preferably provided via the site controllers 112–115.

A description of the organization of the radio communication system 100 and an implementation of the present invention is described hereinbelow. First, the geographical separation between each site and every other site are determined and tabulated. Next, the pair of sites with the largest geographical separation is selected from the table. In the exemplary communication system 100 shown in FIG. 1, the site pair 101, 104 has the largest geographical separation 119 and, accordingly, is selected from the table. A first site (e.g., 101) of the pair 101, 104 is arbitrarily selected to begin the process of establishing a logical connection between the sites 101–110 and the site controllers 112–115. Upon selecting site 101, the tabulated separations are consulted to determine which site is closest to site 101. As depicted in FIG. 1, site 106 has the smallest geographical separation 121 from site 101. Thus, site 106 is selected to form a group of selected sites (i.e., 101,106) that includes site 101. However, if the closest site (e.g., 106) provides an excessive number of communication resources, a site substantially adjacent to site 101 (e.g., 107) might alternatively be selected to form the group. Similarly, additional sites, that are substantially adjacent to site 101 (e.g., 107–108), are selected and added to the group 101, 106. This process continues for as long as the number of communication resources provided by the group 101, 106–108 does not exceed a predetermined number that can be accommodated by a first site controller (e.g., 112). This predetermined number is preferably a number that is less than the maximum number that can be accommodated, as later described; however, it may also be the maximum number. Upon completion of this selection process, the group of selected sites 101, 106–108, which resides in a first controller service area 123, is assigned—and thereafter logically connected—to site controller 112.

The remaining sites 102–105, 109–110 are assigned to the remaining site controllers 113–115 in a manner similar to the assignment process described above. The table of geographical separations is queried to determine a second pair of sites (e.g., 102, 104) with the largest geographical separation 122 among the sites not yet selected (i.e., 102–105, 109–110). A first site (e.g., 102) of the pair 102, 104 that is closest to the group of selected sites 101, 106–108 is chosen to begin the formation of a second controller service area 124. Upon selecting site 102, the tabulated separations are again consulted to determine which sites are substantially adjacent to site 102. As depicted in FIG. 1, site 103 has the smallest geographical separation from site 102. Thus, site 103 is selected to form a second group of selected sites (i.e., 102–103) that includes site 102. Similarly, additional sites, that are substantially adjacent to site 102 (e.g., 109), are selected and added to the second group 102–103 given that the number of communication resources provided by the group 102–103, 109 does not exceed the predetermined number that can be accommodated by a second site controller (e.g., 114). Upon completion of this selection process, the group of selected sites 102–103, 109 resides in the second controller service area 124 and is assigned—and thereafter logically connected—to site controller 114.

The remaining sites 104–105, 110 are assigned to the remaining site controllers 113, 115 in a similar manner, such that site controller 115 is logically connected to the site 104 that resides in a third controller service area 125 and site controller 113 is logically connected to the sites 105, 110 that reside in a fourth controller service area 126. Accordingly, it should be noted that a site controller (e.g., 115) might only be assigned to one site (e.g., 104) when the addition of any unselected sites to the group containing the one site results in a group that provides an excessive number of communication resources, or when the one site is the only remaining site that has not yet been selected. It should be further noted that the last site controller (e.g., 113) might be assigned a larger number of communication resources than is desired—for example, when the last remaining sites (e.g., 105, 110) provide more than the preferred number of communication resources. Thus, an adjustment of the number of sites, and accordingly the number of communication resources, assigned to the site controllers 112–115 may be required to balance the loading condition (i.e., the number of communication resources) of some, or all, of the site controllers 112–115. This adjustment procedure is described in detail below.

By assigning the sites 101–110 to the site controllers 112–115 via the present invention, a geographic balance is maintained between the site controllers 112–115 and their assigned controller service areas 123–126, as compared to the disregard for geographic balance provided by the dynamic programming techniques of the prior art. Thus, the present invention accommodates movement of communication units within the radio communication system 100 while substantially reducing the average number of communication handoffs performed between the site controllers 112–115 during any particular communication. This reduction in the average number of handoffs arises from an increase in the amount of time that traveling communication units remain in a particular controller service area (e.g., 123) due to the desirable controller service area configurations provided by the present invention. By contrast, prior art communication system assignment techniques generally result in controller service areas with undesirable geographic characteristics, such as a controller service area that contains a substantially linear arrangement of sites in a long, narrow geographic pattern. Accordingly, prior art assignment methods promote significantly more communication handoffs, on average, between the site controllers 112–115 during a communication of similar length, since the communication units frequently travel through the controller service areas as configured by the prior art.

Figure 2:
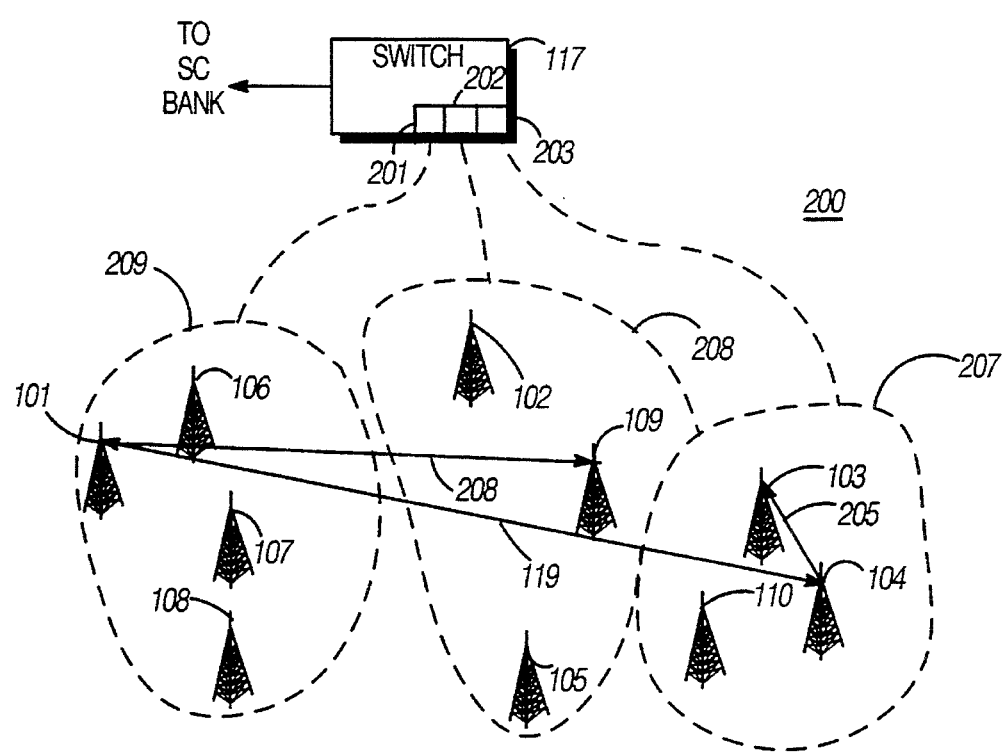
FIG. 2 illustrates an alternate radio communication system that exemplifies the establishment of a logical connection between sites and a switching center, in accordance with the present invention.

FIG. 2 illustrates an alternate radio communication system 200 that includes the plurality of sites 101–110 and the switching center 117, in accordance with the present invention. In this embodiment, the switching center 117 includes a plurality of control portions 201–203 that typically comprise registers in a known office dependent database. Each control portion 201–203 might represent one of a plurality of paging service areas 207–209 that are collectively used to track communication units as they roam throughout the radio communication system 200. Such tracking allows each communication unit to be easily located in the event that a particular communication unit is to be summoned to receive a communication, or call.

Similar to the discussion with regard to FIG. 1, the process of establishing a logical connection between the sites 101–110 and the control portions 201–203 begins by determining and tabulating the geographical separations between each site and every other site in the radio communication system 200. The pair of sites 101, 104 with the largest geographical separation 119 is selected from the table. Here, a first site 104 of the pair 101, 104 is selected—noting again that this first selection is arbitrary—to commence the process of assigning the sites 101–110 to the switching center 117. Upon selecting site 104, the tabulated separations are consulted to determine which site is least distally separated from site 104. As depicted in FIG. 2, site 103 has the smallest geographical separation 205 from site 104. Thus, site 103 is selected to form a group of selected sites (i.e., 103–104) that includes site 104. Similarly, additional sites, that are substantially adjacent to site 104 (e.g., 110), are selected and added to the group given that the number of communication resources provided by the group does not exceed a predetermined number that can be accommodated by a first control portion (e.g., 203) of the switching center 117. Upon completion of this selection process, the group of selected sites 103–104, 110, which resides in a first paging service area 207, is assigned—and thereafter logically connected—to control portion 203.

The remaining sites 101–102, 105–109 are assigned to the remaining control portions 201–202 in a manner similar to that described above with reference to FIG. 1. Upon completion of the assignments, control portion 202 is logically connected to the sites 102, 105, 109 that reside in a second paging service area 208, while control portion 201 is logically connected to the sites 101, 106–108 that reside in a third paging service area 209. It should again be noted that a control portion (e.g., 201) might only be assigned to one site (e.g., 101) when the addition of any unselected sites to the group containing the one site results in a group that provides an excessive number of communication resources, or when the one site is the only remaining site that has not yet been selected. It should be further noted that the last control portion (e.g., 201), like the last site controller 113 above, might be assigned a larger number of communication resources than is preferred. Thus, an adjustment of the number of sites, and accordingly the number of communication resources, assigned to the control portions 201–203 may be required to balance the loading condition of some, or all, of the control portions 201–203. This adjustment procedure is similar to the adjustment procedure that might be required to balance the loading conditions of the site controllers 112–115 in FIG. 1, and is described in detail below.

In a preferred embodiment, the radio communication system 100 performs simultaneous assignment of the sites 101–110 to both the site controllers 112–115 and the control portions 201–203 of the switching center 117. Although the assignment processes are similar, the assignments are performed independently of one another since there typically does not exist any functional interrelation between the two types of service areas (i.e., controller and paging).

Figure 3:
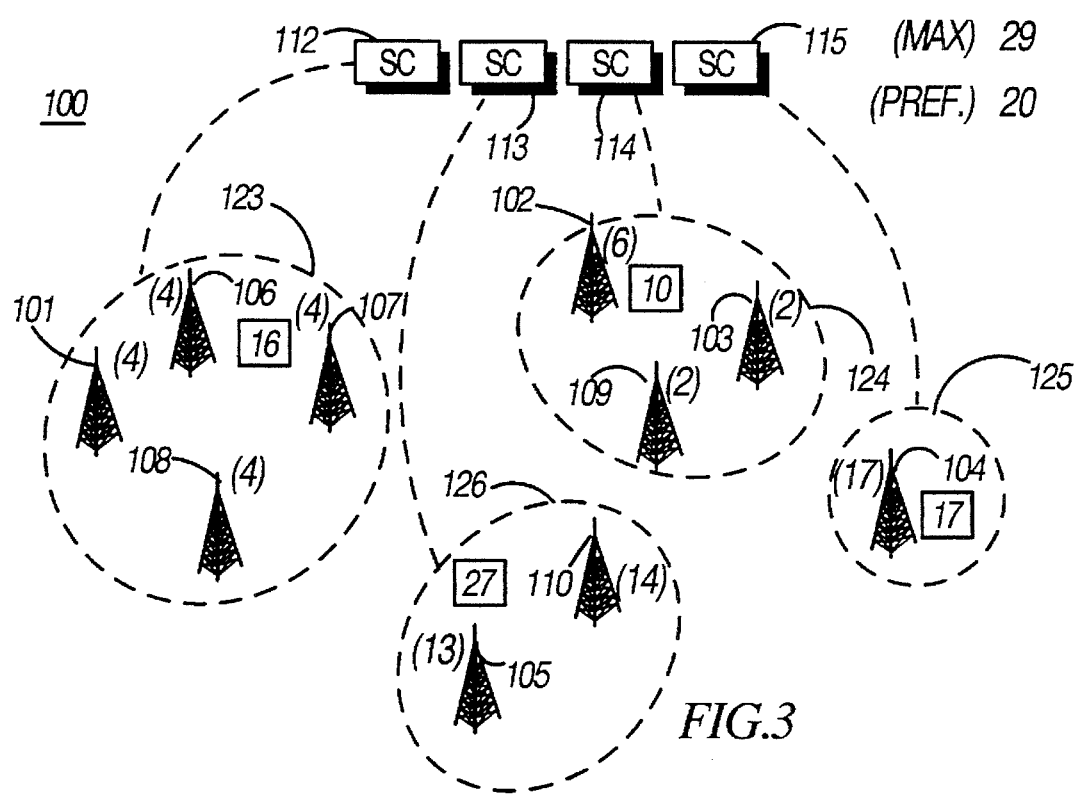
FIG. 3 illustrates the radio communication system of FIG. 1, and further exemplifies load balancing of the site controllers, in accordance with the present invention.

FIG. 3 illustrates the radio communication system 100 of FIG. 1, less the switching center 117. Although the switching center 117 is not shown in FIG. 3, the site controllers 112–115 remain operably coupled to the switching center 117 as illustrated in FIG. 1. As depicted, each controller service area 123–126 includes a current number of communication resources (as denoted by the number in the box included in each service area) assigned to each respective site controller 112–115. Likewise, each site 101–110 is characterized by a number of communication resources (as denoted in parentheses adjacent to each site) that it provides to its respective controller service area 123–126. As briefly mentioned above, each site controller 112–115 can accommodate a predetermined load, or number, of communication resources. As an example, in the radio communication system 100 of FIG. 3 the preferred number of communication resources accommodated by each site controller 112–115 is 20, while the maximum number of communication resources accommodated by each site controller 112–115 is 29. It should be noted that, although each site controller 112–115 in the exemplary radio communication system 100 accommodates identical preferred and maximum numbers of communication resources, communication resource accommodation of each site controller 112–115 need not be identical.

To demonstrate how the loading conditions of the site controllers 112–115, or equivalently the control portions 201–203, are balanced subsequent to the above described assignment processes, it is assumed that each site controller 112–115 services a respective controller service area 123–126 and has been assigned a corresponding number of communication resources. The corresponding number of communication resources is the mathematical sum of the communication resources provided by each of the sites in the respective controller service area (e.g., 16 communication resources for site controller 112). The adjustment, or balancing, procedure is initiated by selecting a first controller service area (e.g., 126) whose quantity of communication resources exceeds a predetermined threshold. In this case, the predetermined threshold is the preferred number of communication resources supported by each site controller 112–115. As shown, controller service area 126 includes two sites 105, 110 that provide a total of 27 communication resources. Thus, the site controller 113 that services controller service area 126 supports a differential amount of seven communication resources in excess of its preferred number.

Upon selecting the first controller service area 126, the pair of sites with the largest geographical separation contained within the first controller service area 126 is selected to provide a site that is to be reassigned to another controller service area and, accordingly, to another site controller. In this particular radio communication system 100, controller service area 126 contains only two sites 105, 110. Accordingly, one site (e.g., 110) of the pair 105, 110 is chosen to be reassigned to a second controller service area (e.g., 124) whose quantity of communication resources is below the preferred number that can be supported by its corresponding site controller (i.e., 114). The second controller service area 124 is selected as one being substantially adjacent to the first controller service area 126 and closest to the chosen site 110. The chosen site 110 is re-configured into the second controller service area 124 and assigned to site controller 114 to complete the load balancing of site controller 113. Upon completing this portion of the adjustment, site controller 113 supports 13 communication resources and site controller 114 supports 24 communication resources.

Since the number of communication resources supported by site controller 114, after the load balancing of site controller 113, is above the preferred number of 20, adjustment of the number of sites 102–103, 109–110 in the second controller service area 124 is performed, if possible, to balance the communication resource loading of site controller 114. Similar to the above described process of load balancing site controller 113, the pair of sites with the largest geographical separation contained within the second controller service area 124 is selected to provide a site that is to be reassigned to another site controller. As shown, the pair of sites 102, 110 have the largest geographical separation among the sites 102–103, 109–110 assigned to the second controller service area 124. Accordingly, one site (e.g., 102) of the pair 102, 110 is chosen to be reassigned to a third controller service area (e.g., 123) that has not been previously balanced and whose quantity of communication resources is below the preferred number that can be supported by its corresponding site controller (i.e., 112). The third controller service area 123 is selected as one being substantially adjacent to the second controller service area 124 and closest to the chosen site 102. The chosen site 102 is re-configured into the third controller service area 123 and is assigned to site controller 112 to complete the load balancing of site controller 114. Upon completing this additional portion of the adjustment, site controller 113 supports 13 communication resources, site controller 114 supports 18 communication resources, and site controller 112 supports 22 communication resources.

Since the number of communication resources supported by site controller 112, after the load balancing of site controller 114, is above the preferred number of 20, adjustment of the number of sites 101–102, 106–108 in the third controller service area 123 is again performed, if possible, to balance the communication resource loading of site controller 112. As above, the balancing and reassignment begins by selecting the pair of sites contained within the third controller service area 123 that has the largest geographical separation. As shown, the pair of sites 101, 102 have the largest geographical separation among the of sites 101–102, 106–108 assigned to the third controller service area 123. Accordingly, one site of the pair 101, 102 is chosen to be reassigned to a fourth controller service area that has not yet been balanced and whose quantity of communication resources is below the preferred number that can be supported by its corresponding site controller. However, in this case, there are no controller service areas that reside substantially adjacent to the third controller service area 123 and that have not been previously balanced. Therefore, the load balancing of the site controllers 112–115 in this particular radio communication system 100 has been completed.

As briefly noted above, the aforementioned balancing procedure is equally applicable to adjusting the loading conditions of the control portions 201–203 of the switching center 117 in FIG. 2. Further, it should be noted that the loading adjustment procedure might be independently performed to balance the loading conditions of any previously assigned site controllers or switching center control portions. That is, the disclosed load balancing technique is not restricted to being a supplement to the above described site controller and control portion assignment processes.

The present invention provides a method for establishing a logical connection between a plurality of sites and either a plurality of site controllers or a switching center in a radio communication system. With this invention, the sites are assigned to the site controllers, or control portions of the switching center, such that there is a geographic balance of the respective service areas that are serviced by the site controllers, or the control portions. By establishing this geographic balance, the present invention substantially reduces the average number of handoffs conducted between the site controllers, or the control portions, during typical communications, as compared to the average number of handoffs required in systems using prior art assignment techniques. Further, the present invention provides a means for balancing the quantity of communication resources supported by each site controller, or control portion.

Accordingly, with the instant invention, the communication traffic load is divided equally among the site controllers, or control portions. The present invention therefore emphasizes the concept of traffic load uniformity among the site controllers or control portions, a feature that is nonexistent in prior art assignment techniques. Further, by incorporating the communication resource load adjustment, the present invention substantially reduces the probability of overloading any of the site controllers, or the control portions, since the communication resources accommodated by either the site controllers or the control portions, upon completion of the adjustment, are at or below a quantity that can be readily supported by either of the entities.

What is claimed is:

1. In a radio communication system that includes a plurality of communication resources, a plurality of sites, and a plurality of site controllers, each site of the plurality of sites providing at least one communication resource of the plurality of communication resources, a method for establishing a logical connection between the plurality of sites and the plurality of site controllers, the method comprising the steps of:

a) determining geographical separation between each pair of the plurality of sites and selecting a first site of a first pair of the plurality of sites, wherein geographical separation between the first pair exceeds geographical separation between any other pair of the plurality of sites;

b) selecting at least a second site of the plurality of sites, such that the first site and the at least a second site combine to produce a group of selected sites, wherein the group of selected sites provides not more than a predetermined number of the plurality of communication resources that can be accommodated by a first site controller of the plurality of site controllers;

c) assigning the group of selected sites to the first site controller;

d) selecting a third site of a second pair of the plurality of sites, wherein geographical separation between the second pair exceeds geographical separation between any pair among those sites of the plurality of sites not yet selected; and e) assigning the third site to a second site controller of the plurality of site controllers to establish the logical connection between the plurality of sites and the plurality of site controllers.

2. The method of claim 1, wherein step (b) comprises the step of selecting as the second site a site of the plurality of sites that is substantially adjacent to the first site.

3. The method of claim 1, wherein step (b) comprises the step of selecting as the second site a site of the plurality of sites that is closest to the first site.

4. The method of claim 1, wherein step (d) comprises the step of selecting as the third site a site of the plurality of sites that is substantially adjacent to the group of selected sites.

5. The method of claim 1, further comprising the steps of:

f) selecting at least a fourth site of the plurality of sites that is substantially adjacent to the third site; and g) assigning the at least a fourth site to the second site controller, wherein the third site and the at least a fourth site together provide not more than a predetermined number of the plurality of communication resources that can be accommodated by the second site controller.

6. The method of claim 5, further comprising the step of:

h) assigning a remaining group of the plurality of sites not yet selected to at least a last of the plurality of site controllers.

7. The method of claim 6, further comprising the step of:

i) determining a loading condition for each of the plurality of site controllers.

8. The method of claim 7, further comprising the step of:

j) adjusting the loading condition of at least one of the plurality of site controllers such that loading conditions for the plurality of site controllers are substantially balanced.

9. The method of claim 8, wherein the radio communication system further includes a plurality of controller service areas, wherein the group of selected sites resides in a first controller service area of the plurality of controller service areas, wherein the third site and the at least a fourth site together reside in a second controller service area of the plurality of controller service areas, wherein the remaining group of the plurality of sites resides in at least a third controller service area of the plurality of controller service areas, and wherein the step of adjusting the loading condition of at least one of the plurality of site controllers comprises the steps of:

j1) selecting one controller service area of the plurality of controller service areas to produce a first selected controller service area, wherein the first selected controller service area includes at least two sites of the plurality of sites, wherein the at least two sites provide a first quantity of the plurality of communication resources, and wherein the at least two sites are assigned to a site controller of the plurality of site controllers that services the first selected controller service area;

j2) comparing the first quantity to a first predetermined threshold;

j3) when the first quantity exceeds the first predetermined threshold by a first differential amount of communication resources, selecting an alternate controller service area of the plurality of controller service areas to produce a second selected controller service area, wherein the second selected controller service area is substantially adjacent to the first selected controller service area, and wherein a site controller servicing the second selected controller service area can accommodate at least some of the first differential amount of communication resources; and j4) assigning at least one site of the at least two sites to the site controller servicing the second selected controller service area, wherein the at least one site is substantially adjacent to the second selected controller service area and provides not more than the at least some of the first differential mount of communication resources.

10. The method of claim 9, wherein step (j1) comprises the step of selecting as the one controller service area a controller service area of the plurality of controller service areas that is serviced by the last of the plurality of site controllers.

11. The method of claim 9, wherein those sites assigned to the site controller servicing the second selected controller service area provide a second quantity of the plurality of communication resources, and wherein the step of adjusting the loading condition of at least one of the plurality of site controllers further comprises the steps of:

j5) comparing the second quantity to a second predetermined threshold;

j6) when the second quantity exceeds the second predetermined threshold by a second differential amount of communication resources, selecting a second alternate controller service area of the plurality of controller service areas to produce a third selected controller service area, wherein the third selected controller service area is substantially adjacent to the second selected controller service area, and wherein a site controller servicing the third selected controller service area can accommodate at least some of the second differential amount of communication resources; and j7) assigning at least one site from those sites in the second selected controller service area to the site controller servicing the third selected controller service area, wherein the at least one site from those sites in the second selected controller service area is substantially adjacent to the third selected controller service area and provides not more than the at least some of the second differential amount of communication resources.

12. The method of claim 11, further comprising the step of:

j8) assigning remaining sites of the plurality of sites, that are located in controller service areas of the plurality of controller service areas not yet selected, to the plurality of site controllers until each site controller of the plurality of site controllers accommodates not more than a corresponding predetermined number of communication resources.

13. In a radio communication system that includes a plurality of paging service areas, a plurality of communication resources, a plurality of sites, and a switching center, each site of the plurality of sites providing at least one communication resource of the plurality of communication resources, a method for establishing a logical connection between the plurality of sites and the switching center, the method comprising the steps of:

a) determining geographical separation between each pair of the plurality of sites and selecting a first site of a first pair of the plurality of sites, wherein geographical separation between the first pair exceeds geographical separation between any other pair of the plurality of sites;

b) selecting at least a second site of the plurality of sites, such that the first site and the at least a second site combine to produce a group of selected sites, wherein the group of selected sites resides in a first paging service area of the plurality of paging service areas and provides not more than a predetermined number of the plurality of communication resources that can be accommodated by a first control portion of the switching center;

c) assigning the group of selected sites to the first control portion;

d) selecting a third site of a second pair of the plurality of sites, wherein geographical separation between the second pair exceeds geographical separation between any pair among those sites of the plurality of sites not yet selected, and wherein the third site resides in a second paging service area of the plurality of paging service areas; and e) assigning the third site to a second control portion of the switching center to establish the logical connection between the plurality of sites and the switching center.

14. The method of claim 13, further comprising the steps of:

f) selecting at least a fourth site of the plurality of sites that is substantially adjacent to the third site, wherein the at least a fourth site resides within the second paging service area, and wherein the third site and the at least a fourth site together provide not more than a predetermined number of the plurality of communication resources that can be accommodated by the second control portion; and g) assigning the at least a fourth site to the second control portion.

15. The method of claim 14, further comprising the step of:

h) assigning a remaining group of the plurality of sites not yet selected to at least a last control portion of the switching center, wherein the remaining group resides in at least a third paging service area.

16. The method of claim 15, further comprising the step of:

i) determining a loading condition for each control portion of the switching center.

17. The method of claim 16, further comprising the step of:

j) adjusting the loading condition of at least one control portion of the switching center such that loading conditions for each control portion of the switching center are substantially balanced.

18. The method of claim 17, wherein the step of adjusting the loading condition of at least one control portion of the switching center comprises the steps of:

j1) selecting one paging service area to produce a first selected paging service area, wherein the first selected paging service area includes at least two sites of the plurality of sites, wherein the at least two sites provide a first quantity of the plurality of communication resources, and wherein the at least two sites are assigned to a control portion of the switching center that services the first selected paging service area;

j2) comparing the first quantity to a first predetermined threshold;

j3) when the first quantity exceeds the first predetermined threshold by a first differential amount of communication resources, selecting an alternate paging service area of the plurality of paging service areas to produce a second selected paging service area, wherein the second selected paging service area is substantially adjacent to the first selected paging service area, and wherein a control portion of the switching center that services the second selected paging service area can accommodate at least some of the first differential amount of communication resources; and j4) assigning at least one site of the at least two sites to the control portion that services the second selected paging service area, wherein the at least one site is substantially adjacent to the second selected paging service area, and provides not more than the at least some of the first differential amount of communication resources.

19. The method of claim 18, wherein step (j1) further comprises the step of selecting as the one paging service area a paging service area of the plurality of paging service areas that is serviced by the last control portion of the switching center.

20. The method of claim 18, wherein those sites assigned to the control portion that services the second selected paging service area provide a second quantity of the plurality of communication resources, and wherein the step of adjusting the loading condition of at least one control portion of the switching center further comprises the steps of:

j5) comparing the second quantity to a second predetermined threshold;

j6) when the second quantity exceeds the second predetermined threshold by a second differential amount of communication resources, selecting a second alternate paging service area of the plurality of paging service areas to produce a third selected paging service area, wherein the third selected paging service area is substantially adjacent to the second selected paging service area, and wherein a control portion of the switching center that services the third selected paging service area can accommodate at least some of the second differential amount of communication resources; and j7) assigning at least one site from those sites in the second selected paging service area to the control portion that services the third selected paging service area, wherein the at least one site from those sites in the second selected paging service area is substantially adjacent to the third selected paging service area and provides not more than the at least some of the second differential amount of communication resources.

21. The method of claim 20, further comprising the step of:

j8) assigning remaining sites of the plurality of sites, that are located in paging service areas of the plurality of paging service areas not yet selected, to control portions of the switching center until each control portion of the switching center accommodates not more than a corresponding predetermined number of communication resources.

22. In a radio communication system that includes a plurality of paging service areas, a plurality of communication resources, a plurality of sites, and a switching center, each site of the plurality of sites providing at least one communication resource of the plurality of communication resources, a method for establishing a logical connection between the plurality of sites and the switching center, the method comprising the steps of:

a) determining geographical separation between each pair of the plurality of sites and selecting a first site of a first pair of the plurality of sites, wherein geographical separation between the first pair exceeds geographical separation between any other pair of the plurality of sites;

b) selecting at least a second site of the plurality of sites that is substantially adjacent to the first site, such that the first site and the at least a second site combine to produce a first group of selected sites, wherein the first group of selected sites resides in a first paging service area of the plurality of paging service areas and provides not more than a predetermined number of the plurality of communication resources that can be accommodated by a first control portion of the switching center;

c) assigning the first group of selected sites to the first control portion;

d) selecting a third site of a second pair of the plurality of sites, wherein geographical separation between the second pair exceeds geographical separation between any pair among those sites of the plurality of sites not yet selected, and wherein the third site is substantially adjacent to the first group of selected sites;

e) selecting at least a fourth site of the plurality of sites that is substantially adjacent to the third site, such that the third site and the at least a fourth site combine to produce a second group of selected sites, wherein the second group of selected sites resides in a second paging service area of the plurality of paging service areas and provides not more than a predetermined number of the plurality of communication resources that can be accommodated by a second control portion of the switching center;

f) assigning the second group of selected sites to the second control portion; and g) assigning a remaining group of the plurality of sites not yet selected to at least a last control portion of the switching center, wherein the remaining group resides in at least a last paging service area of the plurality of paging service areas, to establish the logical connection between the plurality of sites and the switching center.

23. In a radio communication system that includes a plurality of controller service areas, a plurality of communication resources, a plurality of sites, and a plurality of site controllers, each site of the plurality of sites providing at least one communication resource of the plurality of communication resources, each site controller of the plurality of site controllers servicing a controller service area of the plurality of controller service areas, at least one site of the plurality of sites being assigned to each site controller of the plurality of site controllers, a method for adjusting a loading condition of at least one of the plurality of site controllers, the method comprising the steps of:

a) selecting one controller service area of the plurality of controller service areas to produce a first selected controller service area, wherein the first selected controller service area includes at least two sites of the plurality of sites, wherein the at least two sites provide a first quantity of the plurality of communication resources, and wherein the at least two sites are assigned to a site controller of the plurality of site controllers that services the first selected controller service area;

b) comparing the first quantity to a first predetermined threshold;

c) when the first quantity exceeds the first predetermined threshold by a first differential amount of communication resources, selecting an alternate controller service area of the plurality of controller service areas to produce a second selected controller service area, wherein the second selected controller service area is substantially adjacent to the first selected controller service area, and wherein a site controller servicing the second selected controller service area can accommodate at least some of the first differential amount of communication resources; and d) assigning at least one site of the at least two sites to the site controller servicing the second selected controller service area to adjust the loading condition of the site controller servicing the first selected controller service area, wherein the at least one site of the at least two sites is substantially adjacent to the second selected controller service area and provides not more than the at least some of the first differential amount of communication resources.

24. The method of claim 23, wherein those sites assigned to the site controller servicing the second selected controller service area provide a second quantity of the plurality of communication resources, the method further comprising the steps of:

e) comparing the second quantity to a second predetermined threshold;

f) when the second quantity exceeds the second predetermined threshold by a second differential amount of communication resources, selecting a second alternate controller service area of the plurality of controller service areas to produce a third selected controller service area, wherein the third selected controller service area is substantially adjacent to the second selected controller service area, and wherein a site controller servicing the third selected controller service area can accommodate at least some of the second differential amount of communication resources; and g) assigning at least one site from those sites in the second selected controller service area to the site controller servicing the third selected controller service area, wherein the at least one site from those sites in the second selected controller service area is substantially adjacent to the third selected controller service area and provides not more than the at least some of the second differential amount of communication resources.

25. The method of claim 24, further comprising the step of:

h) assigning remaining sites of the plurality of sites, that are located in controller service areas of the plurality of controller service areas not yet selected, to the plurality of site controllers until each site controller of the plurality of site controllers accommodates not more than a corresponding predetermined number of communication resources.

26. In a radio communication system that includes a plurality of controller service areas, a plurality of communication resources, a plurality of sites, and a plurality of site controllers, each site of the plurality of sites being geographically separated from all other sites and providing at least one communication resource of the plurality of communication resources, a method for establishing a logical connection between the plurality of sites and the plurality of site controllers, the method comprising the steps of:

a) determining geographical separation between each pair of the plurality of sites and selecting a first site of a first pair of the plurality of sites, wherein the geographical separation between the first pair exceeds the geographical separation between any other pair of the plurality of sites;

b) selecting at least a second site of the plurality of sites that is substantially adjacent to the first site, such that the first site and the at least a second site combine to produce a first group of selected sites, wherein the first group of selected sites resides in a first controller service area of the plurality of controller service areas and provides not more than a predetermined number of the plurality of communication resources that can be accommodated by a first site controller of the plurality of site controllers;

c) assigning the first group of selected sites to the first site controller;

d) selecting a third site of a second pair of the plurality of sites, wherein the geographical separation between the second pair exceeds the geographical separation between any pair among those sites of the plurality of sites not yet selected, and wherein the third site is substantially adjacent to the first group of selected sites;

e) selecting at least a fourth site of the plurality of sites that is substantially adjacent to the third site, such that the third site and the at least a fourth site combine to produce a second group of selected sites, wherein the second group of selected sites resides in a second controller service area of the plurality of controller service areas and provides not more than a predetermined number of the plurality of communication resources that can be accommodated by a second site controller of the plurality of site controllers;

f) assigning the second group of selected sites to the second site controller;

g) assigning a remaining group of the plurality of sites not yet selected to at least a last of the plurality of site controllers, wherein the remaining group resides in at least a last controller service area of the plurality of controller service areas;

h) determining a loading condition for each of the plurality of site controllers;

i) selecting the last controller service area to produce a first selected controller service area, wherein the first selected controller service area includes at least two sites of the plurality of sites, wherein the at least two sites provide a first quantity of the plurality of communication resources, and wherein the at least two sites are assigned to a site controller of the plurality of site controllers that services the first selected controller service area;

j) comparing the first quantity to a first predetermined threshold;

k) when the first quantity exceeds the first predetermined threshold by a first differential amount of communication resources, selecting an alternate controller service area of the plurality of controller service areas to produce a second selected controller service area, wherein the second selected controller service area is substantially adjacent to the first selected controller service area, and wherein a site controller servicing the second selected controller service area can accommodate at least some of the first differential amount of communication resources;

assigning at least one site of the at least two sites to the site controller servicing the second selected controller service area, wherein the at least one site is substantially adjacent to the second selected controller service area and provides not more than the at least some of the first differential amount of communication resources; and m) assigning remaining sites of the plurality of sites, that are located in the second controller service area and in controller service areas of the plurality of controller service areas not yet selected, to the plurality of site controllers until each site controller of the plurality of site controllers accommodates not more than a corresponding predetermined number of communication resources, to establish the logical connection between the plurality of sites and the plurality of site controllers.

\* \* \* \* \*